United States Patent [19]
Platter et al.

[11] 4,370,802
[45] Feb. 1, 1983

[54] METHOD OF MAKING A THIN FILM MAGNETIC HEAD ASSEMBLY WITH MULTICONDUCTIVE CONNECTING ELEMENTS

[75] Inventors: Sanford Platter, Boulder, Colo.; Pierre Shelley, Santa Barbara, Calif.

[73] Assignee: Applied Magnetics Corporation, Goleta, Calif.

[21] Appl. No.: 181,089

[22] Filed: Aug. 25, 1980

[51] Int. Cl.³ .............................................. G11B 5/42
[52] U.S. Cl. ...................................................... 29/603
[58] Field of Search .................. 29/603; 360/127, 129

[56] References Cited

U.S. PATENT DOCUMENTS

| | | | |
|---|---|---|---|
| 3,402,463 | 9/1968 | Bos et al. | 29/603 |
| 3,494,026 | 2/1970 | Sugaya | 29/603 |
| 3,624,897 | 12/1971 | Reade et al. | 29/603 |
| 4,143,458 | 3/1979 | Gibson | 29/603 |

*Primary Examiner*—Carl E. Hall
*Attorney, Agent, or Firm*—Daniel J. Meaney, Jr.

[57] ABSTRACT

A method of making a thin film magnetic head assembly having a substrate, superstrate and thin film magnetic transducer mounted therebetween wherein the thin film magnetic transducer includes conductive leads located interior to and extending between the substrate and superstrate comprising the steps of mounting a thin film transducer on the substrate with the transducing portion thereof located adjacent one edge of the substrate, positioning a preformed planar conductive connecting member formed of an elongated support section and a plurality of spaced, aligned connecting elements having a relatively thin coating of diffusable conductive metal coating located on one side positioned in intimate contact with the conductive leads with the connecting elements and the elongated support section extending passed the substrate, placing a superstrate in alignment with the substrate, thin film magnetic transducer and planar conductive connecting member with the surface thereof in intimate engagement with the connecting elements to form a sub-assembly thereof having a predetermined space which has a dimension equal to the sum of the thickness of one of the conductive leads, the planar conductive connecting member and the thickness of the diffusable conductive metal coating thereon, placing a quantity of insulating material adjacent the spaced opposed edges and in the vicinity of the transducing portion of the thin film magnetic transducer, heating the sub-assembly, urging the superstrate and the substrate together with a clamping force enabling the diffusable conductive metal coating to diffuse into both the conductive leads and connecting elements.

11 Claims, 14 Drawing Figures

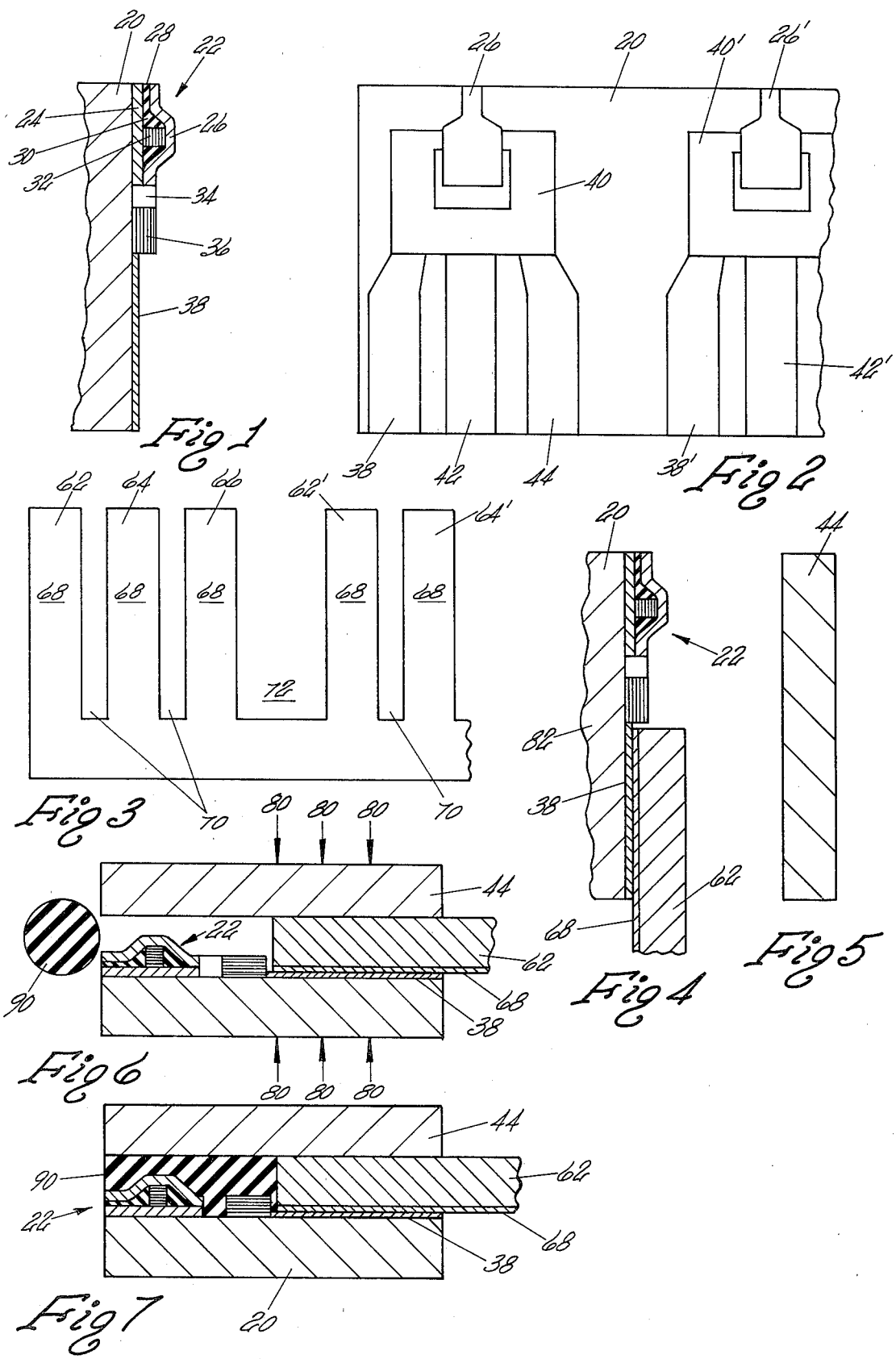

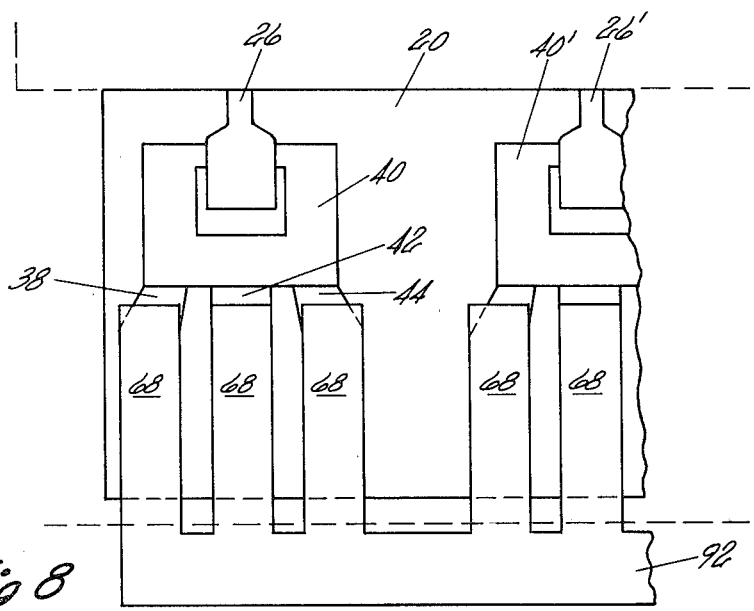
Fig 8
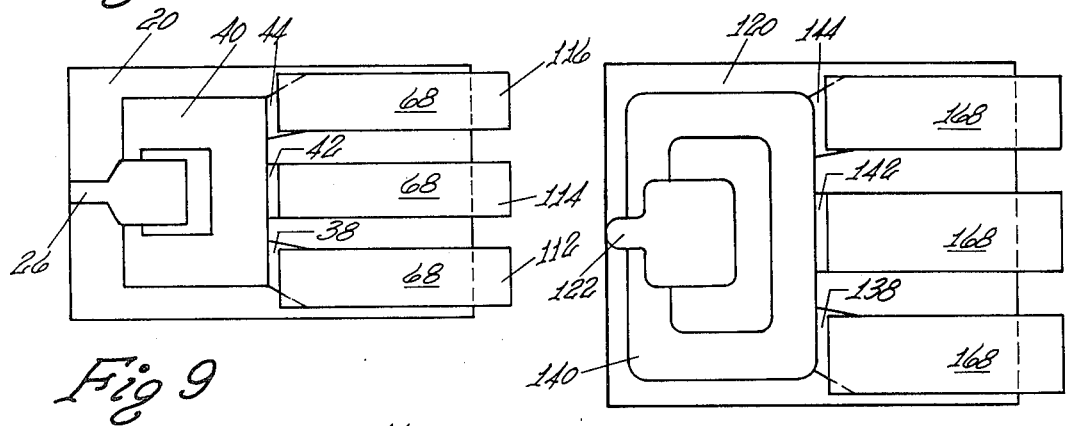
Fig 9
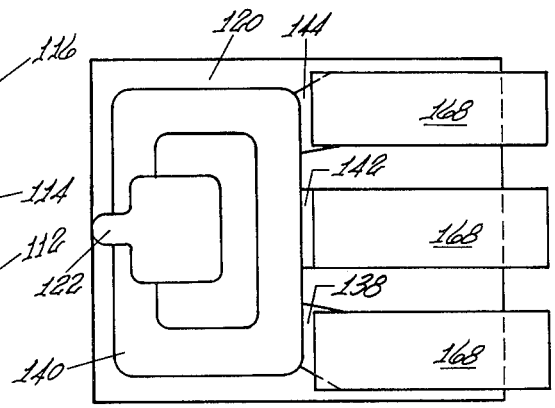
Fig 12
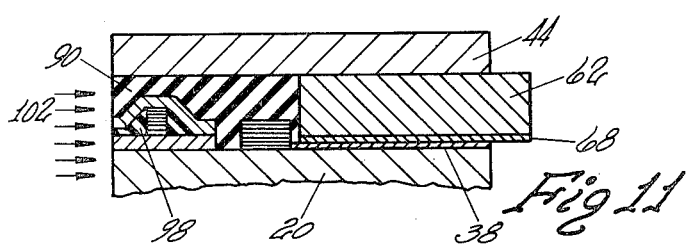
Fig 10
Fig 11
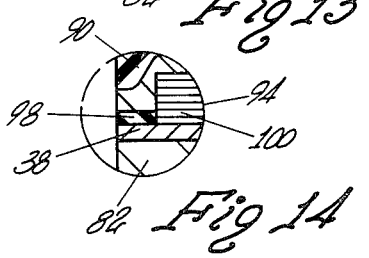
Fig 13
Fig 14

METHOD OF MAKING A THIN FILM MAGNETIC HEAD ASSEMBLY WITH MULTICONDUCTIVE CONNECTING ELEMENTS

BACKGROUND OF THE INVENTION

1. Field of the Invention

This invention relates to a new and novel method of manufacturing a thin film magnetic head assembly having a thin film magnetic transducer, substrate, superstrate and connecting elements joined to conductive leads of the thin film magnetic transducer by a diffused electrical connection formed of a diffusable conductive metal layer by use of a planar conductive connecting member used as a spacer and by heating, clamping and maintaining the so clamped sub-assembly at a predetermined bonding temperature for a selected time period to enable a preformed glass layer by capillary action to encapsulate the thin film magnetic transducer, and the conductive leads and connecting elements joined together by a diffused electrical connection and bond the same into an integral thin film head assembly.

2. Disclosure of the Prior Art

It is known in the prior art to manufacture ferrite magnetic heads having at least two pole pieces formed of sintered ferromagnetic oxide material wherein the pole pieces are joined together with a short gap therebetween to from the transducing portion thereof and wherein the pole pieces are bonded together by glass. Typical of such known methods are the methods disclosed in U.S. Pat. Nos. 3,577,634; 3,246,383 and 3,024,318. Magnetic heads manufactured by the above known methods are combined with housings or ceramic sliders to form magnetic head assemblies used in apparatus, systems and equipment for storing and retrieving information in a recording media.

In order to produce smaller magnetic head assemblies, reduce the size of the gap forming the transducing portion of such magnetic head assemblies and to increase the recording densities and decrease the track widths of such magnetic head assemblies, new techniques have been developed to produce thin film magnetic transducers. Such thin film magnetic transducers can be fabricated by use of known vapor deposition, sputtering or plating techniques. Typical of such thin film magnetic transducers produced by use of the vapor deposition techniques are those disclosed in U.S. Pat. Nos. 3,867,368 and 3,846,841. Other thin film transducers are disclosed in U.S. Pat. Nos. 4,052,749 and 4,092,688.

With the rapid advance in techniques for manufacturing thin film magnetic transducers, the prior art includes many known techniques for fabricating the thin film magnetic head assemblies using thin film magnetic transducers. Typically, epoxy, glass bonding and other adhesives are used to form an integral bonded thin film magnetic head assembly.

One such glass bonding technique is disclosed in U.S. Pat. Nos. 4,143,458 and 4,191,983 to George W. Gibson, and assigned to the same Assignee as is this present invention.

SUMMARY OF THE INVENTION

The present invention discloses, teaches and claims a significant improvement in fabrication and assembly of thin film magnetic head assemblies using a thin film, vapor deposited, magnetic transducer.

Gibson in U.S. Pat. No. 4,143,458 discloses that known thin film magnetic transducers when heated to a temperature above 500° C. causes irreversible damage to the magnetic and/or electrical characteristics of the thin film magnetic transducer causing the same to be permanently destroyed. Thus, the temperature at which either the magnetic or electrical characteristics of the thin film transducer would be affected establishes a thermal stress temperature which cannot be exceeded during fabrication of thin film magnetic head assemblies.

The use of glass bonding techniques in certain of the above referenced U.S. patents for fabricating ferrite poles pieces use glass materials that have melting temperatures in the order of 900° C. to insure that the coefficient of expansions of the ferrite and glass insulating and bonding material are substantially the same.

In the method of making a thin film magnetic head assembly disclosed in the above referenced U.S. Pat. No. 4,143,458, the use of a glass bonding material having a melting point below the thermal stress temperature is disclosed. A glass bonding material in the form of a thin rod located exterior to the assembly formed of the substrate, superstrate and thin film magnetic transducer is drawn into a cavity within the assembly by capillary action. The glass bonding material and the assembly are maintained at a bonding temperature located in a temperature range of the melting point of the glass material and the thermal stress temperature. The cavity within the assembly was formed by means of a spacing member. In order to insure that conductive leads from the thin film transducer were not encapsulated in the glass bonding material and would be accessable for attachment of connecting leads or elements thereto, the quantity of glass materially drawn in to the cavity had to be precisely controlled.

The present invention teaches a novel and unique method of assembling a thin film magnetic head assembly by using a substrate, thin film magnetic transducer, superstrate, a quantity of insulating glass material preferably in the form of a thin glass rod and a planar conductive connecting member having connecting elements wherein at least one surface thereof has a diffusable conductive metal coating layer formed thereon which when the sub-assembly compounds are heated in a preselected atmosphere which inhibits oxidation and corrosion of the sub-assembly components to a selected bonding temperature and when subjected to a clamping force during the heating to the bonding temperature and subsequent maintaining of the assembly at the bonding temperature for a predetermined period of time results in a glass bonded thin film magnetic head assembly wherein both the thin film magnetic transducer and conductive leads thereof electrically connected together by a diffused electrical connection are encapsulated by the glass bonding material.

One advantage of the present invention is that the method for making the thin film magnetic head assemblies results in the conductive leads of the thin film magnetic transducers used therein being positively and electrically joined to connecting members and that electrical connection being encapsulated by the glass bonding material to insure a hermatically sealed connection.

Another advantage of the present invention is the the connecting members extend from the thin film magnetic head assembly and are adapted to have electrical connectors affixed thereto rather than directly to the thin film magnetic transducer as is necessary in certain of the prior art head assemblies.

A further advantage of the present invention is that by use of a preformed planar conductive connecting member, the thin film magnetic head assemblies can be fabricated with the connecting elements of the planar conductive connecting member held in place during the manufacturing process and when completed, a support section thereof is easily removed resulting in easily accessable connecting elements adapted to have external electrical leads connected thereto without exposing the conductive leads and thin film magnetic transducers to external conditions such as overheating during soldering of the electrical leads to the connecting elements.

BRIEF DESCRIPTION OF THE DRAWING

The foregoing and other advantages and features of the invention will become apparent from the following features of the preferred embodiment when considered together with the illustrations in the accompanying drawings which include the following figures:

FIG. 1 is a pictorial diagram of a thin film magnetic transducer mounted on a selected surface of a substrate;

FIG. 2 is a schematic representation of a substrate surface having a plurality of space aligned thin film magnetic transducers deposited thereon wherein each thin film magnetic transducer has a three conductive leads extending therefrom;

FIG. 3 is a pictorial representation of a preformed planar conductive connecting member having a support section and a plurality of connecting elements extending substantially perpendicular therefrom and wherein the bottom surface of the connecting elements have a relatively thin diffusable conductive metal coating formed thereon;

FIG. 4 is a pictorial representation of the positioning of the planar conductive connecting member relative to the conductive leads of the thin film magnetic transducer and with the diffusable conductive metal layer of the connecting elements in intimate engagement with the conductive leads;

FIG. 5 is a pictorial representation of the placing of the superstrate into alignment in order to place the same into intimate engagement of the sub-assembly of illustrated in FIG. 4;

FIG. 6 is pictorial representation of the final relationship between the sub-assembly of FIG. 4 and the superstrate of FIG. 5 with a thin glass rod of insulating glass material positioned adjacent the predetermined space and with a clamping action being urged against the substrate and superstrate;

FIG. 7 is a schematic representation of a glass bonded thin film magnetic head assembly with the thin film magnetic transducer and the diffused electrical connection between the conductive leads and the connecting elements encapsulated with the glass bonding insulating layer;

FIG. 8 is a pictorial representation of the positioning of the planar conductive connecting member relative to the conductive leads of the thin film magnetic transducer and with the diffusable conductive metal layer of the connecting elements in intimate engagement with the conductive leads;

FIG. 9 is pictorial representation of the final relationship between the conductive leads and the connecting elements with the support section removed;

FIG. 10 is a schematic representation of a glass bonded thin film magnetic head assembly with the thin film magnetic transducer and the diffused electrical connection between the conductive leads and the connecting elements encapsulated with the glass bonding insulating layer;

FIG. 11 is a schematic representation of a lapped thin film magnetic transducer of FIG. 10;

FIG. 12 is a pictorial representation of a top view of another embodiment of a thin film transducer which may be fabricated into a thin film magnetic head assembly using the teachings of this invention;

FIG. 13 is a pictorial representation of a plan view in cross-section of another embodiment of a lapped thin film magnetic head assembly using the teachings of theis invention; and FIG. 14 is an enlarged pictorial representation partially in cross-section showing the small gap of the transducing portion of the embodiment illustrated in FIG. 13.

DESCRIPTION OF THE PREFERRED EMBODIMENT

FIGS. 1 to 8, inclusive, show a method of making a thin film magnetic head assembly having a substrate, superstrate and thin film magnetic transducer mounted therebetween wherein the thin film magnetic transducer may be fabricated by any known vapor deposition, sputtering or plating techniques. In the preferred embodiment of the present invention a substrate 20 is adapted to have a thin film magnetic transducer, shown generally by arrow 22, affixed thereto. The thin film magnetic transducer 22 illustrated in FIG. 1 has a lower pole piece 24, an upper pole piece 26 and a gap which is formed to have a preselected length. In a typical embodiment, the gap has a dimension in the order of about one micron or less. Depending upon the techniques used to fabricate the thin film magnetic transducer, an insulating material 30 may be deposited in the gap, which is illustrated as insulated gap 28, and may fill the space between the gap and a coil stack 32. In the embodiment illustrated in FIG. 1, the thin film magnetic transducer has a plurality of stacked coil windings 32. However, the thin film magnetic transducer may have a planar spiral coil structure. Therefore, the construction of the thin film magnetic transducer is not essential to the method of this invention and any thin film transducer may be used in practicing this invention. For example, thin film magnetoresistive transducers may be used to fabricate thin film head assemblies using the teachings of the present invention.

Typically the thin film magnetic transducer includes a transducing portion formed by lower pole piece 24 and upper pole piece 26 to define the gap 28. In FIG. 1, the transducing portion is located exterior to adjacent edges of the substrate 20. The thin film magnetic transducer has a plurality of conductive leads illustrated as 38 extending therefrom. Preferably, the conductive leads are of sufficient length to at least extent to another edge of the substrate other that the edge having the transducing portion of the thin film magnetic transducer.

In practicing the method of the present invention, the step of mounting, on a selected surface of the substrate 20, a thin film magnetic transducer 22 with the transducing portion thereof located adjacent one edge of the substrate 22 which intersects with said selected surface.

FIG. 2 illustrates the use of a single substrate 20 which has a plurality of spaces aligned identical thin film transducers affixed thereto wherein the upper pole piece 26, windings 40 and three conductive leads 38, 42 and 44 extending therefrom. The other identical transducers likewise have similar elements, the upper pole piece 28', coil windings 40, and conductive leads 38' 42' being typical. In a batch fabrication process, typically a plurality of thin film transducers are formed on a single substrate and are maintained in the form during manufacturing. When the thin film magnetic transducers are completed, the finished head assemblies are cut or sliced into individual components.

FIG. 3 illustrates the construction of the preferred embodiment of a preformed planar conductive connecting member. The preformed planar conductive member has a thickness at least equal to that of the thin film magnetic transducer 22. As illustrated in FIG. 3, the planar conductive connecting member is formed of an elongated support section 60 and a plurality of spaced, aligned connecting elements 62, 64 and 66 or 62', 64' or 66' 68 extending substantially perpendicular from the elongated support section 60. In the preferred embodiment, the spacings 70 between connecting elements 62, 64 and 68 are substantially equal to the spacings between the conductive leads 38, 42 and 44 illustrated in FIG. 2. An indexing opening 72 has a dimension equal to the spacings of the thin film magnetic transducers on a single substrate 20 to enable batch assembly of the thin film magnetic head assemblies.

As shown in FIG. 4, the connecting elements 62, 64 and 66 include a relatively thin diffusable conductive metal coating 68 located on one side thereof. In this embodiment, the metal coating 68 extends to the support section 60, although that is not necessary, but desireable.

In FIG. 5, a superstrate 44 is adapted to be positioned in alignment with the sub-assembly of FIG. 4. The surface of the superstrate 44 is planar in shape.

Referring to the step illustrated in FIG. 6, the step includes placing the superstrate 44 in alignment with the substrate 20, the thin film magnetic transducer 22 and the planar conductive connecting member such that the one edge of the superstrate 44 is located adjacent the transducing portion of the thin film magnetic transducer 22 and the one edge of the substrate 20 in intimate engagement with the planar conductive connecting member to form a sub-assembly thereof having a predetermined space between the surface of the superstrate and the selected surface of the substrate 20. A quantity of insulating bonding material which, in the preferred embodiment is formed into a thin elongated rod, is positioned adjacent the predetermined space. The dimension of the predetermined space is equal to the sum of the thickness of one of the conductive leads 38, 42 or 44, the planar conductive connecting member and the thickness of the diffusable conductive metal coating 68 thereon.

In the preferred embodiment, the insulating bonding material 90 is glass having a melted point temperature which is at least 40° C. less than the thermal stress temperature. Typically, the melting point temperature of the glass layer is about 455° C. and the thermal stress temperature is about 500° C.

The so assembled sub-assembly is then subject to the step of controllably heating the sub-assembly in a preselected atmosphere which inhibits oxidation and corrosion thereof at a heating rate which permits the thermal stresses of the sub-assembly to be maintained at a level to avoid damage or permanent distortion to the sub-assembly during heating thereof up to a bonding temperature located in a bonding temperature range between the melting point temperature of the insulating bonding material and below the thermal stress temperature.

One example of a preselected atmosphere used in practicing this invention utilized a conveyor furnace which is well known in the art. The conveyor furnace had an internal muffle in the form of an open tube. The internal muffle had a generally rectangular cross-section, for example a rectangular side of about four (4) inches, a cross-sectional area of about sixteen (16) square inches, and a length of about fifteen (15) feet. The preselected atmosphere was formed by continuously purging the internal muffle, during the controllably heating step, with nitrogen gas having a purity which does not exceed two (2) to three (3) parts of oxygen per million parts of nitrogen. In this example, the flow rate of the nitrogen was about sixty (60) standard cubic feet per minute. Typical heating times for the sub-assembly when transported from the entrance of the muffle to the exit were in the order of about ten (10) hours.

During the controllably heating step, a concurrent step occurs which is the urging of the superstrate 44 and the substrate 20 of the sub-assembly together with a clamping force illustrated by arrows 80 in FIG. 6 to form a compression boundary between the surface of the connecting elements, such as for example connecting element 62 in FIG. 6, having the diffusable metal coating layer, such as for example the diffusable conductive metal layer 68 in FIG. 6, in intimate contact with the conductive leads, such as for example conductive lead 38 in FIG. 6, enabling the diffusable conductive metal coating 68 to diffuse into both the conductive leads and connecting elements to form a diffused electrical connection therebetween.

The heated and clamped sub-assembly is maintained at a bonding temperature within the bonding temperature range for a time period sufficient to enable the insulating bonding material of the rod 90 to substantially fill the predetermined space between the substrate 20 and superstrate 44 by capillary action to encapsulate and bond the thin film magnetic transducer 22, connecting elements and the conductive leads having the diffused electrical connection therebetween into a thin film magnetic head assembly.

The schematic representation of FIG. 7 shows the final arrangement between the substrate 20, superstrate 44, thin film magnetic transducer 22, insulating bonding material 90 within the predetermined space, the conductive lead 68 jointed by a diffused electrical connection of layer 68 to the connecting element 62.

After the insulating bonding material 90 has substantially filled the predetermined space, the sub-assembly is then subject to the step of controllably cooling the same at a cooling rate which permits the thermal stresses of the sub-assembly to be maintained at a level to avoid damage to the sub-assembly during cooling thereof to an ambient temperature.

FIG. 8 depicts the step wherein the planar conductive connecting member is positioned with one side of the connecting elements 62, 64 and 66 having the diffusable conductive metal coating 68 thereon in intimate contact with the conductive leads 38, 42 and 44 such that a portion of the connecting elements together with the elongated support section 92 of the planar conductive connecting member extend passed an edge of the substrate 20 other than the one edge adjacent the transducing portion of the thin film magnetic transducer. This step occurs in order to 90 fully encapsulates the thin film magnetic transducer of FIG. 9. A superstrate 44 cooperates with the substrate 20 to have the conductive leads 38, the connecting element 62 and the diffused metal layer 68 extending beyon the edge of the substrate 20.

FIG. 11 shows the step of lapping the thin film magnetic head assembly along the spaced opposed edges of the substrate 20 and superstrate 44 to form a treated surface 102 having a transducing portion of the thin film magnetic head exposed as a part thereof. A portion of the gap insulating layer 98 may be used to form the gap in the thin film magnetic transducer. This, of course, is not formed as part of this method, but is part of the method of making the thin film magnetic transducer.

The alternate embodiments of FIGS. 11, 12 and 13 envision that the connecting elements are integral with the conductive leads and electrical conductors may be affixed to the connecting members at the extended edge, the element 68 being indicitive of such electrically conductive elements.

In the preferred mode, the diffusable conductive metal may be any diffusable conductive metal. However, the diffusable conductive metal is preferrable copper, gold or tin. In practicing this invention it is desirable that the lead frames and conductors on the thin film magnetic transducer be free and clear of contaminants, oxides, corrosion products or other such contaminants which would otherwise interfere with the fusion and bonding process.

What is claimed is:

1. A method of making a thin film magnetic head assembly having a substrate, superstrate and thin film magnetic transducer mounted therebetween wherein the thin film magnetic transducer includes a transducing portion located exterior to adjacent edges of the substrate and superstrate and with conductive leads located interior to and extending between the substrate and superstrate comprising the steps of mounting on a selected surface of a substrate a thin film magnetic transducer with the transducing portion thereof located adjacent one edge of said substrate which intersects with said selected surface;

positioning a preformed planar conductive connecting member having a thickness at least equal to that of the thin film magnetic transducer and formed of an elongated support section and a plurality of spaced, aligned connecting elements extending substantially perpendicular from the elongated support section wherein the connecting elements include a relatively thin diffusable conductive metal coating located on one side thereof with said one side of the connecting elements having said diffusable conductive metal coating thereon in intimate contact with the conductive leads such that a portion of said connecting elements together with the elongated support section of the planar conductive connecting member extend passed an edge of a substrate other than the one edge adjacent the transducing portion of said thin film magnetic transducer;

placing a superstrate in alignment with the substrate, thin film magnetic transducer and planar conductive connecting member such that the one edge of the superstrate is located adjacent the transducing portion of the thin film magnetic transducer and the one edge of the substrate in intimate engagement with the planar conductive connecting member to form a sub-assembly thereof having a predetermined space between the surface of the superstrate and the selected surface of the substrate, the dimension of the predetermined space being equal to the sum of the thickness of one of the conductive leads, the planar conductive connecting member and the thickness of the diffusable conductive metal coating thereon;

placing a quantity of insulating bonding material adjacent the spaced opposed edges and in the vicinity of the transducing portion of the thin film magnetic transducer, said insulating bonding material being selected of a material which is electrically and magnetically compatible with the thin film magnetic transducer and which has a melting point temperature below a thermal stress temperature at which at least one of the electrical characteristics and the magnetic characteristics of the thin film magnetic transducer are permanently distorted;

controllably heating the sub-assembly in a preselected atmosphere which inhibits oxidation and corrosion of the sub-assembly components at a heating rate which permits the thermal stresses of the sub-assembly to be maintained at a level to avoid damage to the sub-assembly during heating thereof up to a bonding temperature located in a bonding temperature range between the melting point temperature of the insulating bonding material and below the thermal stress temperature;

during the controllably heating, urging the superstrate and the substrate of the sub-assembly together with a clamping force to form a compression boundary between the surface of the connecting elements having the diffusable metal coating layer in intimate contact with the conductive leads enabling the diffusable conductive metal coating to diffuse into both the conductive leads and connecting elements to form a diffused electrical connection therebetween; and maintaining the heated and clamped sub-assembly at a bonding temperature within the bonding temperature range for a time period sufficient to enable the insulating bonding material to substantially fill the predetermined space between the substrate and superstrate by capillary action to encapsulate and bond said thin film magnetic transducer, connecting elements and the conductive leads having the diffused electrical connection therebetween into a thin film magnetic head assembly.

2. The method of claim 1 wherein the insulating bonding material is glass having a melting point temperature which is at least 40° C. less than the thermal stress temperature.

3. The method of claim 2 wherein the melting point temperature of the glass layer is about 455° C. and the thermal stress temperature is about 500° C.

4. The method of claim 3 wherein the sub-assembly is heated to a bonding temperature in a temperature range of about 455° C. to about 500° C.

5. The method of claim 4 further comprising the step of after the insulating bonding material has substantially filled the predetermined space, controllably cooling the sub-assembly at a cooling rate which permits the thermal stresses of the sub-assembly to be maintained at a level to avoid damage to the sub-assembly during cooling thereof to an ambient temperature.

6. The method of claim 5 comprising the step of lapping the thin film magnetic head assembly along the spaced opposed edges of the substrate and superstrate to form a treated surface having a transducing portion of the thin film magnetic head exposed as a part thereof.

7. The method of claim 6 further comprising the step of attaching an electrically conductive conductor to the connecting elements.

8. The method of claim 3 wherein the diffusable conductive metal coating is copper.

9. The method of claim 3 wherein the diffusable conductive metal coating is gold.

10. The method of claim 3 wherein the diffusable conductive metal coating is tin.

11. The method of claim 4 wherein the preselected atmosphere is defined by a chamber having an inlet and outlet and further comprising the step of
purging the chamber with a nitrogen gas having oxygen therein which is less than about 2 parts of oxygen per million parts of nitrogen.

* * * * *